(12) United States Patent
Deppert et al.

(10) Patent No.: US 9,902,802 B2
(45) Date of Patent: *Feb. 27, 2018

(54) ZINC SULFIDE COUPLING AGENTS

(71) Applicant: Raytheon Company, Waltham, MA (US)

(72) Inventors: Thomas M. Deppert, Gilbert, AZ (US); David R. Smith, Tucson, AZ (US); William C. Mollberg, Marana, AZ (US); Brian J. Zelinski, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 333 days.

This patent is subject to a terminal disclaimer.

(21) Appl. No.: 14/563,371

(22) Filed: Dec. 8, 2014

(65) Prior Publication Data

US 2016/0159968 A1    Jun. 9, 2016

(51) Int. Cl.
B32B 7/04 (2006.01)
B32B 9/04 (2006.01)
B32B 27/06 (2006.01)
B32B 27/16 (2006.01)
C08K 5/36 (2006.01)
C08K 5/37 (2006.01)
C08K 5/372 (2006.01)
G02B 1/02 (2006.01)
G02B 1/10 (2015.01)
C08G 59/14 (2006.01)
B32B 9/00 (2006.01)

(Continued)

(52) U.S. Cl.
CPC ............ C08G 59/1494 (2013.01); B32B 9/00 (2013.01); B32B 9/04 (2013.01); B32B 27/00 (2013.01); B32B 27/06 (2013.01); G02B 1/10 (2013.01); B32B 7/04 (2013.01); B32B 27/16 (2013.01); B32B 2264/00 (2013.01); B32B 2264/10 (2013.01); B32B 2307/40 (2013.01); B32B 2307/50 (2013.01); B32B 2551/00 (2013.01); B32B 2605/006 (2013.01); C08K 5/36 (2013.01); C08K 5/37 (2013.01); C08K 5/3725 (2013.01); G02B 1/02 (2013.01); G02B 5/208 (2013.01)

(58) Field of Classification Search
None
See application file for complete search history.

(56) References Cited

U.S. PATENT DOCUMENTS 534,586 A     2/1895  Stratton
5,087,733 A   2/1992  Deppert et al.
5,206,013 A   4/1993  Deppert et al.

(Continued)

OTHER PUBLICATIONS

Bochev, Bocho, et al.; "Room Temperature Synthesis of Thioglycolate-Coated Zinc Sulfide (ZnS) Nanoparticles in Aqueous Medium and Their Physicochemical Characterization"; Colloids and Surfaces A: Physicochem. Eng. Aspects; vol. 441; p. 84-90; 2014.

(Continued)

Primary Examiner — Ramsey Zacharia
(74) Attorney, Agent, or Firm — Cantor Colburn LLP

(57) ABSTRACT

An article of manufacture includes a zinc sulfide layer and a coupling agent adhered to the zinc sulfide layer by a disulfide bond. The coupling agent comprises a functional group extending from the zinc sulfide layer.

16 Claims, 2 Drawing Sheets

(51) Int. Cl.
    B32B 27/00    (2006.01)
    G02B 5/20     (2006.01)

(56) References Cited

U.S. PATENT DOCUMENTS

| | | | |
|---|---|---|---|
| 5,254,335 A | 10/1993 | Deppert et al. | |
| 2001/0038925 A1* | 11/2001 | Barton | C09C 3/10 428/690 |
| 2004/0038310 A1* | 2/2004 | Bawendi | B82Y 15/00 435/7.1 |
| 2005/0192430 A1* | 9/2005 | Rosenthal | B82Y 15/00 530/391.3 |
| 2007/0221947 A1 | 9/2007 | Locascio et al. | |

OTHER PUBLICATIONS

Deppert, Thomas M., et al.; "Substantivity of Dyes and Surfactants Containing Isothiuronium Groups to Hair"; J. Soc. Cosmet. Chem.; vol. 42; p. 1-17; Jan./Feb. 1991.

"Isothiouronium—Wikipedia, the free encyclopedia", Retrieved from the Internet: URL: https://en.wikipedia.org/wiki/Isothiouronium, Rretrieved on Jan. 7, 2016, Downloaded from web Jan. 25, 2016, Last modified Feb. 12, 2015, 1 page.

H. Tetsuo Uyeda et al: "Synthesis of Compact Multidentate Ligands to Prepare Stable Hydrophilic Quantum Dot Fluorophores", Journal of the American Chemical Society, Published on Web Feb. 26, 2005, pp. 1-9.

Huaping Zhu et al: "Synthesis and Optical Properties of Thiol Functionalized CdSe/ZnS (Core/Shell) Quantum Dots by Ligand Exchange", Journal of Nanomaterials, Published Mar. 20, 2014, pp. 1-15.

International Search Report and Written Opinion dated Jun. 22, 2017 for Application No. PCT/US2015/054396, 10 pages.

Kwanyeol Paek et al: "Fluorescent and pH-responsive diblock copolymer-coated core-shell CdSe/ZnS particles for a color-displaying, ratiometric pH sensor", Chemical Communications, Accepted Jul. 29, 2011, pp. 1-3.

* cited by examiner

ZINC SULFIDE COUPLING AGENTS

BACKGROUND

The present disclosure relates to zinc sulfide, more specifically to zinc sulfide modified surfaces.

Zinc sulfide is a material used in a variety of optical elements. For some applications, the performance of zinc sulfide optical elements can be improved by coating or treating the zinc sulfide with organic polymers. However, due to the fundamental chemical differences between the ionic salt-like structure of the zinc sulfide and the non-polar nature of the polymers, the organic polymers poorly adhere to the zinc sulfide surfaces. These differences in the chemical nature of the two materials can result in poor wetting of the zinc sulfide, which can lead to poor adhesion.

In other systems, adhesion promoters or primers can be used to couple the organic polymers to the inorganic surfaces. For example, in glasses, silanes can be used as such a promoter/primer.

SUMMARY

According to one embodiment, an article of manufacture includes a zinc sulfide layer and a coupling agent adhered to the zinc sulfide layer by a disulfide bond, wherein the coupling agent includes a functional group extending from the zinc sulfide layer.

In another embodiment, an article of manufacture includes a zinc sulfide layer and a polymer adhered to a surface of the zinc sulfide layer, wherein a coupling agent forming a disulfide bond is disposed between the zinc sulfide layer and the polymer.

Yet, in another embodiment, a method of making an article of manufacture includes attaching a polymer to a zinc sulfide surface, wherein a coupling agent extends from the polymer and forms a disulfide bond with the zinc sulfide surface.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
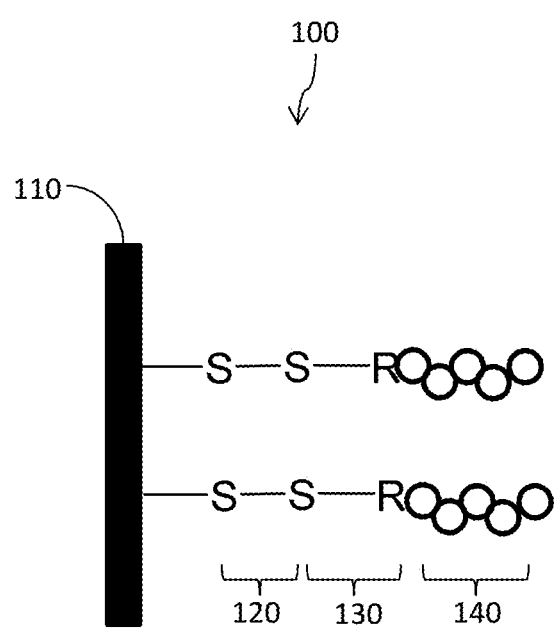
FIG. 1 is a diagram of a polymer attached to a zinc sulfide surface with a coupling agent.

Disclosed herein are coupling agents to promote polymer adhesion to zinc sulfide. In one embodiment, an article of manufacture includes a zinc sulfide layer and a coupling agent adhered to the zinc sulfide layer by a disulfide bond. The coupling agent comprises a functional group extending from the zinc sulfide layer. In another embodiment, an article of manufacture includes a zinc sulfide layer and a polymer adhered to a surface of the zinc sulfide layer. A coupling agent forms a disulfide bond and is disposed between the zinc sulfide layer and the organic polymer. Yet, in another embodiment, a method of making an article of manufacture includes attaching an organic polymer to a zinc sulfide surface. A coupling agent extends from the organic polymer and forms a disulfide bond with the zinc sulfide surface.

The articles of manufacture can be any optical element. Non-limiting examples of the articles are lenses, optical windows, sensors, detectors, domes, and beam splitters.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 9, 8, 7, 6, 5, 4, 3, 2, or 1% of the reported numerical value.

As used herein, the term "coupling agent" means a compound having a sulfur atom that can form a disulfide bond with zinc sulfide and a functional group that can form a contact product with or bond with a polymer.

Zinc sulfide is a durable material that is intrinsically transparent to relatively long electromagnetic wavelengths in the far-infrared (IR) range. Such properties contribute to its use in applications which require IR transmission capability, such as in IR detectors and missile domes. Zinc sulfide articles can be produced by chemical vapor deposition (CVD), hot pressing techniques, and hot-isostatic pressing (HIP) techniques. Methods of forming a zinc sulfide surface are known in the art. The conditions, such as temperature and vacuum pressure, under which a zinc sulfide object is formed are also known in the art. The transmission, thermal stability, and strength can depend on the substrate upon which the zinc sulfide is deposited. Depending on the substrate used and conditions employed, a zinc sulfide surface can be suitable to withstand conditions encountered by missiles, projectiles, satellites, and related devices. The present disclosure is not limited to any zinc sulfide deposition or forming method, article shape, or application.

Coupling agents disclosed herein react with zinc sulfide to provide a substantially non-polar surface or a polymer-reactive surface. The modified zinc sulfide surface can be used to provide robust adherent interactions between polymers and zinc sulfide. Polymeric coatings provide improved mechanical properties, stability and protection from handling damage.

The coupling agents have a first sulfur atom containing functional group that reacts with the zinc sulfide surface to form a stable covalent bond, a disulfide bond. The coupling agents also include a second functional group that reacts with the polymer. Accordingly, the coupling agent forms a chemical bond between the zinc sulfide surface and the polymer.

The disulfide-forming coupling agents improve various properties of the zinc sulfide surface. For example, when the coupling agent is bonded to the zinc sulfide surface, the adhesion strength between the polymer and the zinc sulfide is greater than an untreated, like zinc sulfide surface without the coupling agent (see Example 1 below). The coupling agent also improves polymer wetting of the zinc sulfide surface (see Example 1 below).

FIG. 1 is an exemplary diagram 100 of a polymer 140 attached to a zinc sulfide surface 110 with a coupling agent 130. Although the zinc sulfide surface 110 is shown as a flat surface in FIG. 1, the zinc sulfide surface 110 can be any shape. In a non-limiting example, the zinc sulfide surface 110 can be curved, such as concave or convex. The coupling agent 130 can be any sulfur-containing compound that has a reactive sulfur group that can form a disulfide bond 120 with a sulfur atom on the zinc sulfide surface 110. The coupling agent 130 also includes a functional group (R) that extends from the surface of the zinc sulfide layer 110 and can interact with the polymer 140 of interest. The functional group (R) can be any group that can chemically bond, adhesively bond, or interact with the polymer. The functional group (R) can form a contact product with the polymer.

The coupling agent can be a thiol, a thiolate, a thioglycolic acid, or a thioglycolic acid salt. The coupling agent can include any additional functional groups or substitutions, provided that it includes a reactive sulfur-containing group that can form a disulfide bond with the zinc sulfide surface. The coupling agent can have a carbon chain, such as an alkyl, alkenyl, or alkynyl chain extending between the disulfide bond and the functional group. The alkyl, alkenyl, or alkynyl chain can have any number of carbons, depending on the desired polymer and application. In one aspect, the coupling agent has a carbon chain with between about 2 and about 18 carbons. In another aspect, the coupling agent has a carbon chain with between about 12 and about 16 carbons. Yet in another aspect, the coupling agent has a carbon chain with between about 6 and about 18 carbons. Still yet, in another aspect, the coupling agent has a carbon chain with about or in any range between about 2, 3, 4, 5, 6, 7, 8, 9, 10, 11, 12, 13, 14, 15, 16, 17, and 18 carbons.

The functional group on the coupling agent can be any group, depending on the polymer of interest. Non-limiting examples of the functional group include an acrylate group, an acyl halide group, an amide group, an amine group, a carboxylate group, a carboxylate thiol group, an epoxy group, an ester group, an ether group, a halogen, a hydroxamic acid group, a hydroxyl group, a nitrate group, a nitrile group, a phosphate group, a phosphine group, a phosphonic acid group, a silane group, a sulfate group, a sulfide group, a sulfite group, a thiolate group, an alkyl group, an alkenyl group, an alkynyl group, an aryl group, an azide group, an acetal group, an aldehyde group, a diene group, a cycloalkyl group, a cycloaryl group, a polycycloaryl group, a substituted cycloaryl group, or any combination thereof.

The polymer interacting with or bonding with coupling agent is not intended to be limited and depends on the application. Non-limiting examples of suitable polymers include an acrylic polymer, an acrylate polymer, a styrene polymer, a urethane polymer, an epoxy polymer, a polyester polymer, a polyvinyl polymer, a phenoxy polymer, a nylon polymer, a melamine polymer, a fluorinated polymer, a polyvinyl alcohol polymer, a silicone polymer, or any combination thereof. The polymers can be homopolymers or copolymers and can include any additional substitutions or functional groups. The thickness of the polymer layer is not intended to be limited. The thickness depends on the target application.

The optimal conditions for forming a disulfide bond with the zinc sulfide surface will depend on the particular coupling agent used. The solvents, temperatures, and reactant concentration can be tailored accordingly. A basic pH and oxidizing conditions can be used.

The order in which the zinc sulfide surface, the coupling agent, and the polymer are combined can vary. For example, the coupling agent can be first reacted with the zinc surface to form a disulfide bond, and then the polymer can be reacted with the coupling agent. Alternatively, the coupling agent and polymer can be combined and reacted to form a coupling agent-polymer conjugate, and the coupling agent-polymer conjugate can be reacted with the zinc sulfide surface. For example, the coupling agent can be reacted with the polymer to form a zinc-sulfide reactive polymer before attaching the polymer to the zinc sulfide surface.

Isothiouronium salts can be used to couple the polymer to the zinc sulfide surface. Isothiouronium can have the general formula: $RSC(NH_2)_2]^+$, wherein R=alkyl, aryl. The hydrogen (H) groups can be substituted with alkyl or aryl groups. The isothiouronium also has a functional group to interact or bind the polymer, as described below.

In one example, isothiouronium salts can have the following structure:

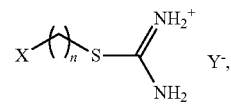

wherein n is an integer from about 2 to 18, X is a functional group that can interact with or bond to the polymer, and $Y^-$ is an anion that can form a salt with the isothiouronium group.

Other suitable isothiouronium salts can have the following structure:

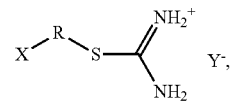

wherein R is an alkyl chain, alkenyl chain, alkynyl chain, or aryl chain containing any number of carbons and optionally substituted with any functional groups; X is a functional group that can interact with or bond to the polymer; and Y⁻ is an anion that can form a salt with the isothiouronium group.

Other non-limiting examples of suitable isothiouronium salts include those having the following structure:

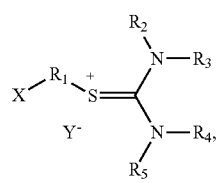

wherein $R_1$, $R_2$, $R_3$, $R_4$, and $R_5$ are each independently a hydrogen, an alkyl chain, an alkenyl chain, an alkynyl chain, or an aryl chain containing any number of carbons, for example from about 1 to about 18, and can be substituted with any functional groups; X is a functional group that can interact with or bond to the polymer; and Y⁻ is an anion that can form a salt with the isothiouronium group. Non-limiting examples for each of $R_2$, $R_3$, $R_4$, and $R_5$ are methyl groups, ethyl groups, propyl groups, butyl groups, or any combination thereof.

Any method known in the art can be used to make isothiouronium salts. Scheme 1 below is an exemplary non-limiting method using an $SN_2$ substitution reaction:

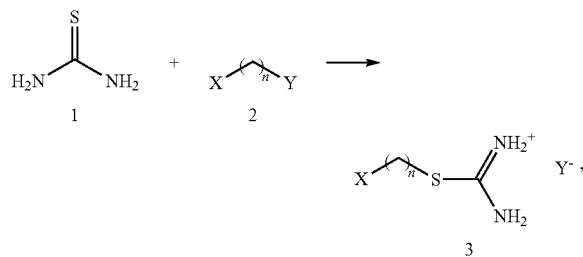

wherein n is any integer, for example between 2 and 18; X is a functional group that can interact with or bond to a polymer of interest; and Y⁻ is a leaving group that can be replaced in an $SN_2$ substitution reaction. As shown, thiourea (1) reacts with compound (2) with the formula: $X(CH_2)_nY$. Y is substituted for the sulfur in thiourea to form the isothiouronium salt (3).

Non-limiting examples of X, as described above, include an acrylate group, an acyl halide group, an amide group, an amine group, a carboxylate group, a carboxylate thiol group, an epoxy group, an ester group, an ether group, a halogen, a hydroxamic acid group, a hydroxyl group, a nitrate group, a nitrile group, a phosphate group, a phosphine group, a phosphonic acid group, a silane group, a sulfate group, a sulfide group, a sulfite group, a thiolate group, an alkyl group, an alkenyl group, an alkynyl group, an aryl group, an azide group, an acetal group, an aldehyde group, a diene group, a cycloalkyl group, a cycloaryl group, a polycycloaryl group, a substituted cycloaryl group, or any combination thereof.

Non-limiting examples of the leaving group, Y, include a protonated hydroxide group, an amino group, an alkoxide group, a fluoride, a chloride, a bromide, an iodide, a methyl sulfate group, a methanesulfonate (mesylate) group, a trifluoromethanesulfonate (triflate) group, a 4-methanebenzenesulfonate (tosylate) group, a dialkylether group, a nitrate group, a phosphate group, an ammonium group, an inorganic ester group, a carboxylate group, a phenoxide group, or an amide group. A hydroxyl group can react with, for example, isocyante to form a urethane. A hydroxyl group can also react with an epoxy polymer.

As shown in Scheme 2 below, the isothiouronium salt (3) is then hydrolyzed with any basic compound (4) to provide the reactive thiol (5) that can form the disulfide bond with zinc sulfide (see FIG. 1).

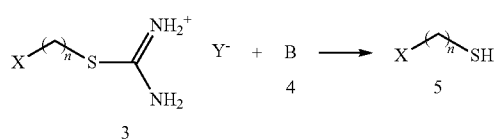

Any of the above described isothiouronium salts can be hydrolyzed and bonded to a zinc sulfide surface and a polymer of interest. The base or basic compound can be any compound, reactant, or solution with a pH value sufficient to hydrolyze the isothiouronium salt. For example, the pH of the base or basic compound can be greater than 7. Non-limiting examples of the base or basic compound include a carbonate compound, a hydroxide compound, a cyanide compound, a borate compound, a phosphate compound, a pyrophosphate compound, a sulfite compound, a sulfide compound, or any combination thereof. The base or basic compound can be a silicate of an alkali metal, including sodium, potassium, lithium, rubidium and cesium; a carbonate compound, a hydroxide compound, a cyanide compound, a borate compound, or a sulfide of ammonia; an alkoxide of an alkali metal; a quaternary ammonium hydroxide, or any combination thereof.

One advantage of using an isothiouronium salt is that it provides a protective group, the isothiouronium group, which allows for introduction of a variety of functional groups (X) into the coupling agent that might otherwise prematurely intra-molecularly interact with a reactive thiolate group. Thus, the protective group allows for formation of the disulfide bond when desired or appropriate.

The isothiouronium salts can be first reacted with the polymer to form an isothiouronium salt-polymer conjugate. The isothiouronium salt-polymer conjugate can then hydrolyzed with a base and then disposed onto the zinc sulfide surface to form a disulfide bond. However, the isothiouronium salt-polymer conjugate can be first disposed onto the zinc sulfide surface and then hydrolyzed with a base at high pH to form the disulfide bond.

Alternatively, the isothiouronium salt can be first hydrolyzed and disposed onto the zinc sulfide surface to form a disulfide bond. Then, the isothiouronium salt bonded to the zinc sulfide surface can be hydrolyzed with a base and then reacted with the polymer.

The coupling agents can be prepared by any method or procedure known in the art. In one non-limiting example, isothiouronium salts can be prepared by reacting thiourea and the corresponding compound having an appropriate leaving group, such as X(CH$_2$)$_n$Y, in an inert, polar, organic solvent (e.g., ethanol) at a temperature of from about 50° to about 80° C. for about 4 to 6 hours. If a precipitate forms upon cooling, it can be filtered and recrystallized from ethanol. If no precipitate forms upon cooling, then the ethanol is removed by rotary evaporation and the residue is employed without further purification.

EXAMPLES

Equimolar amounts of thiourea and bromododecanol were reacted to form 1-dodecanol-12-isothiouronium bromide. 1-dodecanol-12-isothiouronium bromide was reacted with a 0.1 M sodium hydroxide to provide a reactive thiolate. An optical lens having a zinc sulfide surface was treated with the reactive thiolate.

Figure 2A:
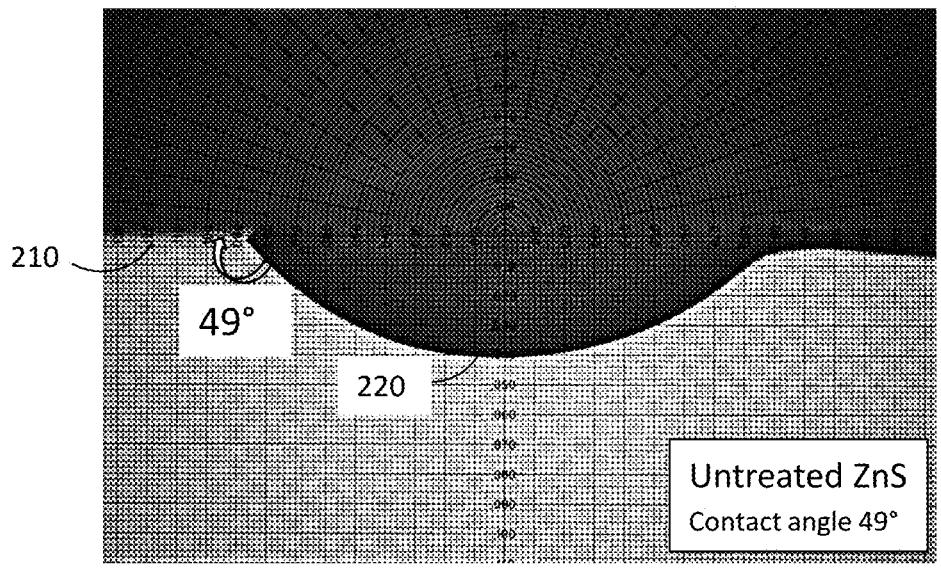
FIG. 2A is a graphical illustration that demonstrates the contact angle formed between an epoxy polymer adhered to an untreated zinc sulfide surface.
Figure 2B:
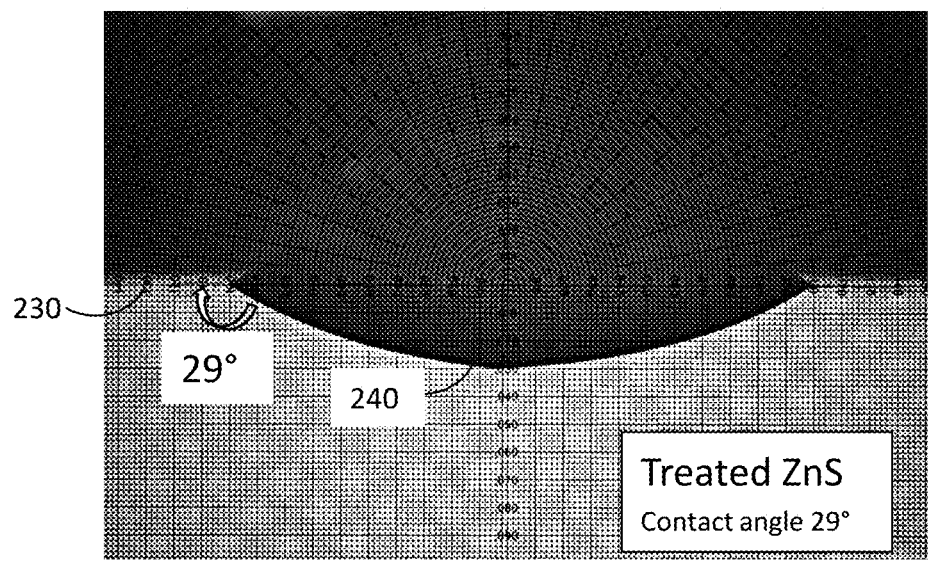
FIG. 2B is a graphical illustration that demonstrates the contact angle formed between an epoxy polymer adhered to a zinc sulfide surface with a coupling agent.

As shown in FIG. 2B, a "dot" of epoxy resin was disposed onto the treated/coupled zinc sulfide surface. The contact angle, or angle formed between the zinc sulfide surface 210 and the epoxy resin "dot" 240 was 29°.

For comparison, FIG. 2A shows a cured "dot" of epoxy resin disposed onto an untreated (without the coupling agent) zinc sulfide surface. The contact angle between the untreated zinc sulfide surface 230 and the epoxy "dot" was 49°. These results demonstrated improved wetting of the zinc sulfide surface on a treated lens.

The treated/coupled zinc sulfide surface also demonstrated improved adhesion compared to the untreated surface. A wooden orange stick was used to attempt to push the epoxy dots off the surfaces of the untreated and treated zinc sulfide surfaces. The cured epoxy dot was easily pushed off the surface of the untreated zinc sulfide surface (FIG. 2A). Yet the cured epoxy dot could not be removed from the surface of the treated/coupled zinc sulfide (FIG. 2B).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An optical element comprising:
   a zinc sulfide layer; and
   a coupling agent adhered to the zinc sulfide layer by a disulfide bond;
   wherein the coupling agent comprises a functional group extending from the zinc sulfide layer that forms a contact product with or bonds to an organic polymer; and
   further comprising reacting the coupling agent with the organic polymer to form a zinc-sulfide reactive polymer before attaching the organic polymer to the zinc sulfide surface.

2. The optical element of claim 1, wherein the optical element is a lens, an optical window, a sensor, a detector, a dome, or a beam splitter.

3. The optical element of claim 1, wherein the functional group is an acrylate group, an acyl halide group, an amide group, an amine group, a carboxylate group, a carboxylate thiol group, an epoxy group, an ester group, an ether group, a halogen, a hydroxamic acid group, a hydroxyl group, a nitrate group, a nitrile group, a phosphate group, a phosphine group, a phosphonic acid group, a silane group, a sulfate group, a sulfide group, a sulfite group, a thiolate group, an alkyl group, an alkenyl group, an alkynyl group, an aryl group, an azide group, an acetal group, an aldehyde group, a diene group, a cycloalkyl group, a cycloaryl group, polycycloaryl group, a substituted cycloaryl group, or any combination thereof.

4. The optical element of claim 1, wherein the coupling agent has an alkyl, alkenyl, or alkynyl chain extending between the disulfide bond and the functional group.

5. The optical element of claim 4, wherein the alkyl, alkenyl, or alkynyl chain has between about 2 and about 18 carbons.

6. The optical element of claim 1, wherein the adhesion strength between the organic polymer and the zinc sulfide surface is greater than a like zinc sulfide surface without the coupling agent.

7. The optical element of claim 1, wherein the coupling agent is a thiol, a thiolate, a thioglycolic acid, or a thioglycolic acid salt.

8. The optical element of claim 1, wherein the coupling agent has an alkyl, alkenyl, or alkynyl chain extending between the disulfide bond and the functional group, and the alkyl, alkenyl, or alkynyl chain has between 12 and 16 carbons.

9. The optical element of claim 1, wherein the organic polymer is an acrylic polymer, an acrylate polymer, a styrene polymer, a urethane polymer, an epoxy polymer, a polyester polymer, a polyvinyl polymer, a phenoxy polymer, a nylon polymer, a melamine polymer, a fluorinated polymer, a polyvinyl alcohol polymer, or a silicone polymer.

10. A method of making an optical element, the method comprising:
    attaching an organic polymer to a zinc sulfide surface;
    wherein a coupling agent extends from the organic polymer and forms a disulfide bond with the zinc sulfide surface; and
    further comprising reacting the coupling agent with the organic polymer to form a zinc-sulfide reactive polymer before attaching the organic polymer to the zinc sulfide surface.

11. The method of claim 10, further comprising treating an isothiouronium salt with a basic compound to form the coupling agent.

12. The method of claim 11, further comprising reacting thiourea with a compound having the following formula: X(CH$_2$)$_n$Y to form the isothiouronium salt;
    wherein X is an acrylate group, an acyl halide group, an amide group, an amine group, a carboxylate group, a carboxylate thiol group, an epoxy group, an ester group, an ether group, a halogen, a hydroxamic acid group, a hydroxyl group, a nitrate group, a nitrile group, a phosphate group, a phosphine group, a phosphonic acid group, a silane group, a sulfate group, a sulfide group, a sulfite group, a thiolate group, an alkyl group, an alkenyl group, an alkynyl group, an aryl group, an azide group, an acetal group, an aldehyde group, a diene group, a cycloalkyl group, a cycloaryl group, a polycycloaryl group, a substituted cycloaryl group, or any combination thereof; and Y is a hydroxide group, an amino group, an alkoxide group, a fluoride, a chloride, a bromide, an iodide, a methyl sulfate group, a mesylate group, a triflate group, a tosylate group, a dialkylether group, a nitrate group, a phosphate group, an ammonium group, an inorganic ester group, a carboxylate group, a phenoxide group, or an amide group.

13. The method of claim 10, wherein the coupling agent has a functional group that forms a contact product with the organic polymer.

14. The method of claim 13, wherein the functional group is an acrylate group, an acyl halide group, an amide group, an amine group, a carboxylate group, a carboxylate thiol group, an epoxy group, an ester group, an ether group, a halogen, a hydroxamic acid group, a hydroxyl group, a nitrate group, a nitrile group, a phosphate group, a phosphine group, a phosphonic acid group, a silane group, a sulfate group, a sulfide group, a sulfite group, a thiolate group, an alkyl group, an alkenyl group, an alkynyl group, an aryl group, an azide group, an acetal group, an aldehyde group, a diene group, a cycloalkyl group, a cycloaryl group, a polycycloaryl group, a substituted cycloaryl group, or any combination thereof.

15. The method of claim 10, wherein the adhesion strength between the organic polymer and the zinc sulfide surface is greater than a like zinc sulfide surface without the coupling agent.

16. The method of claim 10, wherein the optical element is a lens, an optical window, a sensor, or a detector.

* * * * *